(12) United States Patent
Yadav et al.

(10) Patent No.: US 12,522,022 B2
(45) Date of Patent: Jan. 13, 2026

(54) COMPOSITE PDU TIRE IN AN AIRCRAFT CARGO HANDLING SYSTEM

(71) Applicant: Goodrich Corporation, Charlotte, NC (US)

(72) Inventors: Sanjay Yadav, Bangalore (IN); Mohinder Saini, Bangalore (IN)

(73) Assignee: GOODRICH CORPORATION, Charlotte, NC (US)

(*) Notice: Subject to any disclaimer, the term of this patent is extended or adjusted under 35 U.S.C. 154(b) by 779 days.

(21) Appl. No.: 17/846,267

(22) Filed: Jun. 22, 2022

(65) Prior Publication Data

US 2023/0150309 A1 May 18, 2023

(30) Foreign Application Priority Data

Nov. 17, 2021 (IN) .............................. 202141052826

(51) Int. Cl.
| | |
|---|---|
| *B60C 7/24* | (2006.01) |
| *B29D 30/02* | (2006.01) |
| *B60B 9/10* | (2006.01) |
| *B60B 21/02* | (2006.01) |
| *B60C 7/00* | (2006.01) |

(52) U.S. Cl.
CPC ............... *B60C 7/24* (2013.01); *B29D 30/02* (2013.01); *B60B 9/10* (2013.01); *B60B 21/02* (2013.01); *B60C 2007/005* (2013.01)

(58) Field of Classification Search
CPC ............... B60C 7/24; B60C 7/10; B60B 9/10

USPC .............................................. 301/5.307, 5.308
See application file for complete search history.

(56) References Cited

U.S. PATENT DOCUMENTS

| | | | | |
|---|---|---|---|---|
| 2,083,766 | A * | 6/1937 | Wittkopp | B60C 7/24 152/394 |
| 2,878,071 | A * | 3/1959 | Fowlkes | A63C 17/22 301/5.309 |
| 4,944,563 | A * | 7/1990 | Pinchbeck | B60C 7/24 310/97 |
| 5,117,885 | A * | 6/1992 | Crawford | B60C 7/24 152/382 |
| 5,129,709 | A * | 7/1992 | Klamer | A63C 17/24 301/5.308 |
| 5,527,100 | A * | 6/1996 | O'Donnell | A63C 17/22 301/5.302 |
| 5,551,763 | A * | 9/1996 | Alsman | B60C 7/24 301/64.704 |
| 5,725,284 | A * | 3/1998 | Boyer | A63C 17/223 301/5.308 |
| 5,924,705 | A * | 7/1999 | Kubelka | A63C 17/22 280/11.19 |

(Continued)

*Primary Examiner* — Jason R Bellinger
(74) *Attorney, Agent, or Firm* — SNELL & WILMER L.L.P.

(57) ABSTRACT

A composite PDU tire in an aircraft cargo handling system may include a plurality of bonded regions configured to propel cargo within an aircraft cargo bay. The composite tire may include edge regions that are stiffer than a cylindrical region. The edge regions may be configured to have a greater wear resistance and abrasion resistance relative to the cylindrical region. The cylindrical region may be configured to have greater traction relative to the edge regions. The edge regions may include a fillet profile and may be configured to reduce chipping as cargo climbs across the tire.

17 Claims, 12 Drawing Sheets

(56) References Cited

U.S. PATENT DOCUMENTS

| | | | |
|---|---|---|---|
| 6,286,907 B1 * | 9/2001 | Meader | B60C 7/20 |
| | | | 152/393 |
| 6,298,891 B1 * | 10/2001 | Harris | B60C 7/24 |
| | | | 152/382 |
| 6,953,225 B2 * | 10/2005 | Gallagher | A63C 17/01 |
| | | | 301/5.304 |
| 7,878,600 B2 * | 2/2011 | Krantz | B60C 7/24 |
| | | | 301/5.309 |
| 8,220,750 B2 | 7/2012 | Hettwer | |
| 8,911,025 B2 * | 12/2014 | Rota | B60C 7/24 |
| | | | 301/5.307 |
| 9,433,852 B2 * | 9/2016 | Colon | A63C 17/22 |
| 2005/0179310 A1 * | 8/2005 | Miller | A63C 17/22 |
| | | | 301/5.308 |
| 2009/0036283 A1 | 2/2009 | Maumus | |
| 2020/0086689 A1 | 3/2020 | Scheer et al. | |

* cited by examiner

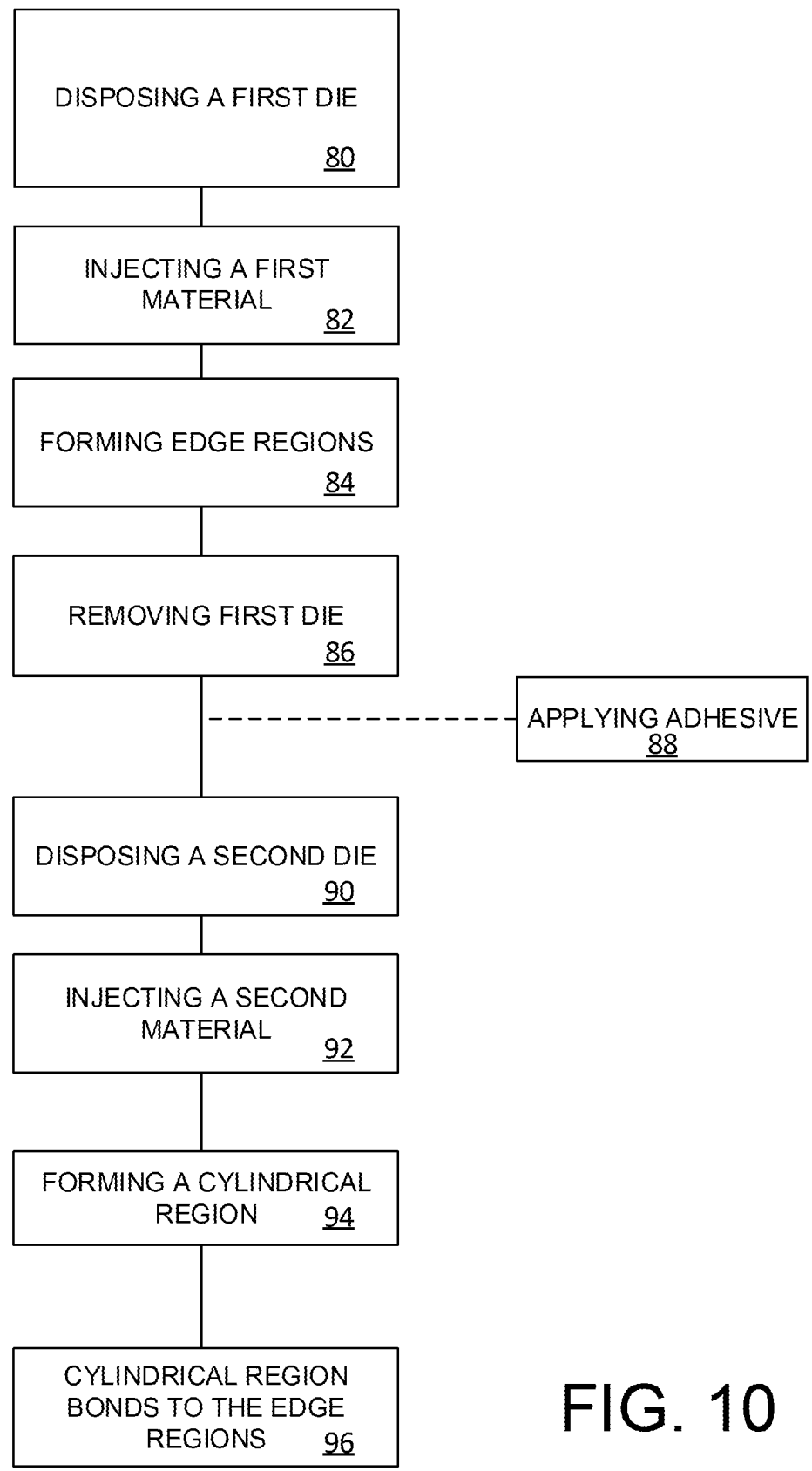

COMPOSITE PDU TIRE IN AN AIRCRAFT CARGO HANDLING SYSTEM

CROSS-REFERENCE TO RELATED APPLICATIONS

This application claims priority to, and the benefit of, India Patent Application No. 202141052826, filed Nov. 17, 2021 (DAS Code E86F) and titled "COMPOSITE PDU TIRE IN AN AIRCRAFT CARGO HANDLING SYSTEM," which is incorporated by reference herein in its entirety for all purposes.

FIELD

The present disclosure relates to a tire, and more specifically, to a composite PDU tire configured to resist chipping.

BACKGROUND

Many aircraft have at least one cargo bay designed to receive cargo. These aircraft cargo bays include utilize powered cargo loading systems comprising a plurality of powered drive units (PDUs) to assist the loading of cargo and equipment into the aircraft. A train and/or series of PDUs may serve to assist pallets and containers of desired dimensions to travel down from fore to aft and from aft to fore of an aircraft (e.g., down the body of the aircraft), typically to the main and lower cargo compartments of the aircraft. Conventionally, PDUs comprise tires to provide motive force and adequate traction to move air freight pallets and containers within the cargo bay, and into and out of the cargo bay. The tires may include thin layers of friction material molded onto a large diameter rigid wheel. Typically, PDU tires used in cargo handling systems need to be replaced due to chipping, which render them less effective in providing traction. Additionally, frequent replacements add to maintenance costs.

SUMMARY

A composite PDU tire for use with a cargo loading system is disclosed herein. In accordance with various embodiments, the tire may comprise a cylindrical region, a first edge region, and a second edge region. The cylindrical region may have a first circumferential groove and a second circumferential groove, and may be located, at least, between the first edge region and the second edge region.

In various embodiments, the first edge region may have a fillet and may be coupled to the first circumferential groove at a first bonding region. In various embodiments, the second edge region may have a fillet and may be coupled to the second circumferential groove at a second bonding region.

In various embodiments, the first edge region and the second edge region may comprise a first material. In various embodiments, the cylindrical region may comprise a second material. The first material may be stiffer than the second material. In various embodiments, the first material and the second material may be different.

In various embodiments, the first edge region may comprise a first extended cylindrical step. The first extended cylindrical step may be coupled to the first circumferential groove of the cylindrical region at the first bonding region. In various embodiments, the second edge region may comprise a second extended cylindrical step. The second extended cylindrical step may be coupled to the second circumferential groove of the cylindrical region at the second bonding region.

In various embodiments, the first edge region may comprise a first box joint profile. The first box joint profile may be coupled to a first complementary interlocking profile extending from the first circumferential groove at the first bonding region. In various embodiments, the second edge region may comprise a second box joint profile coupled to a second interlocking profile extending from the second circumferential groove at the second bonding region.

In various embodiments, the first edge region may comprise a first dovetail profile. In various embodiments, the first dovetail profile may be coupled to a first dovetail pin extending from the first circumferential groove at the first bonding region. In various embodiments, the second edge region may comprise a second dovetail profile coupled to a second dovetail pin extending from the second circumferential groove at the second bonding region.

In various embodiments, the first edge region and the second edge region may have a greater wear resistance relative to the cylindrical region. In various embodiments, the first edge region and the second edge region may have a greater abrasion resistance relative to the cylindrical region.

In various embodiments, the cylindrical region may comprise a plurality of treads. In various embodiments, the cylindrical region may have greater traction relative to the edge regions. In various embodiments, the cylindrical region may have a higher coefficient of thermal expansion relative to the edge regions.

A wheel is also disclosed herein. In accordance with various embodiments, the wheel may comprise a composite tire bonded to the wheel. In various embodiments, the composite tire may be molded onto the wheel. In various embodiments, the wheel may comprise an inner hub. The inner hub may define a cavity. In various embodiments, the wheel may comprise an outer rim. The outer rim may have a flange. In various embodiments, the wheel may be configured to rotate about an axis. In various embodiments, the wheel may be configured to rotate about an axle disposed through the inner hub defining a cavity.

A method for molding a composite tire over a wheel is also disclosed herein. In accordance with various embodiments, the method may comprise disposing a first die relative to a wheel. In various embodiments, the method may comprise injecting a first material at a first temperature into the first die. In various embodiments, the first temperature may be above an ambient temperature. In various embodiments, the first material may form a first edge region and a second edge region.

In various embodiments, the method may comprise removing the first die from the wheel. In various embodiments, the method may comprise disposing a second die relative to the wheel. The second die may be disposed while the first material is above the ambient temperature. In various embodiments, the method may comprise injecting a second material into the second die. The second material may be injected into the second die while the first material is above the ambient temperature. In various embodiments, the second material forms a cylindrical region. In various embodiments, the cylindrical region may bond to the first edge region at a first bonding region. In various embodiments, the cylindrical region may bond to the second edge region at a second bonding region.

In various embodiments, the first edge region may comprise at least one of an extended cylindrical step, a box joint profile, and a dovetail profile. In various embodiments, the second edge region may comprise at least one of an extended cylindrical step, a box joint profile, and a dovetail profile.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

Figure 3:
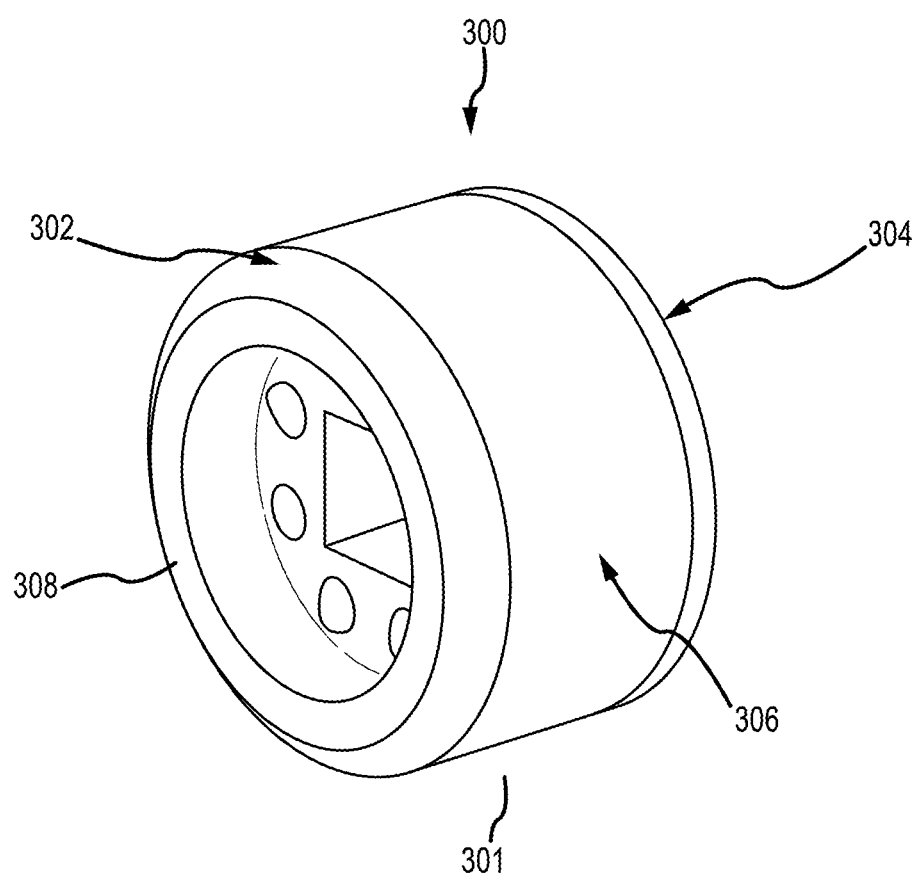
FIG. 3 illustrates an offset view of a PDU tire assembly, with a composite tire and wheel, in accordance with various embodiments.
Figure 6:
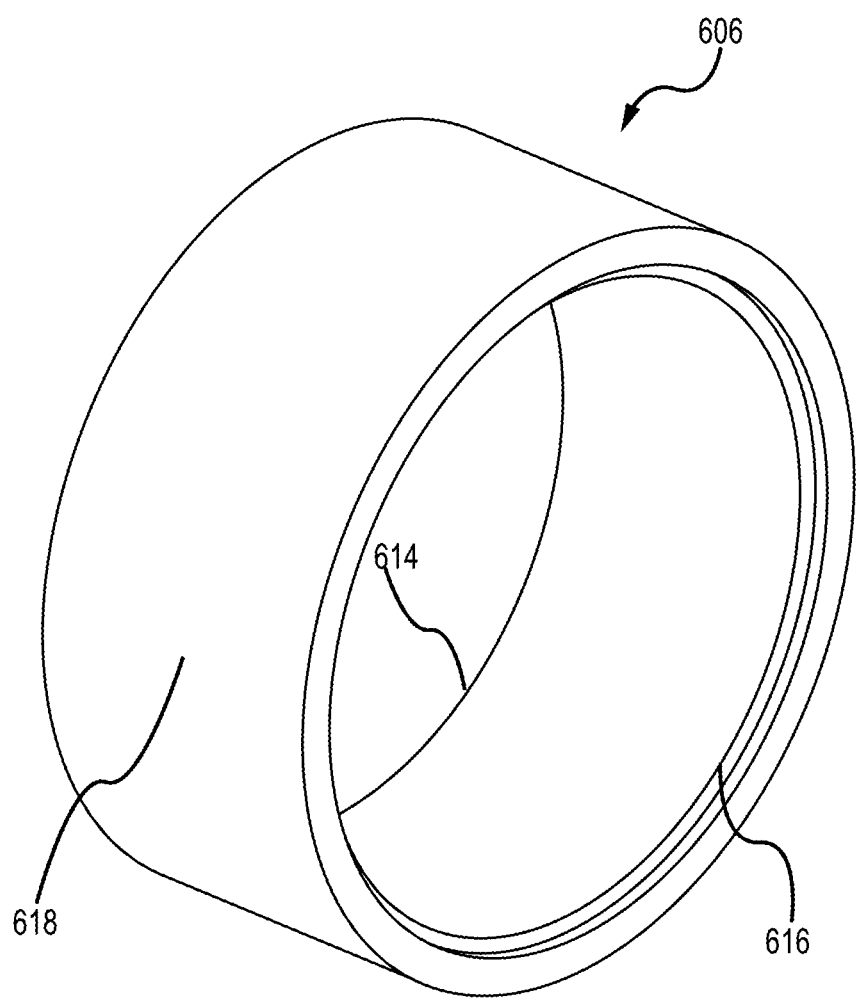
Figure 7A:
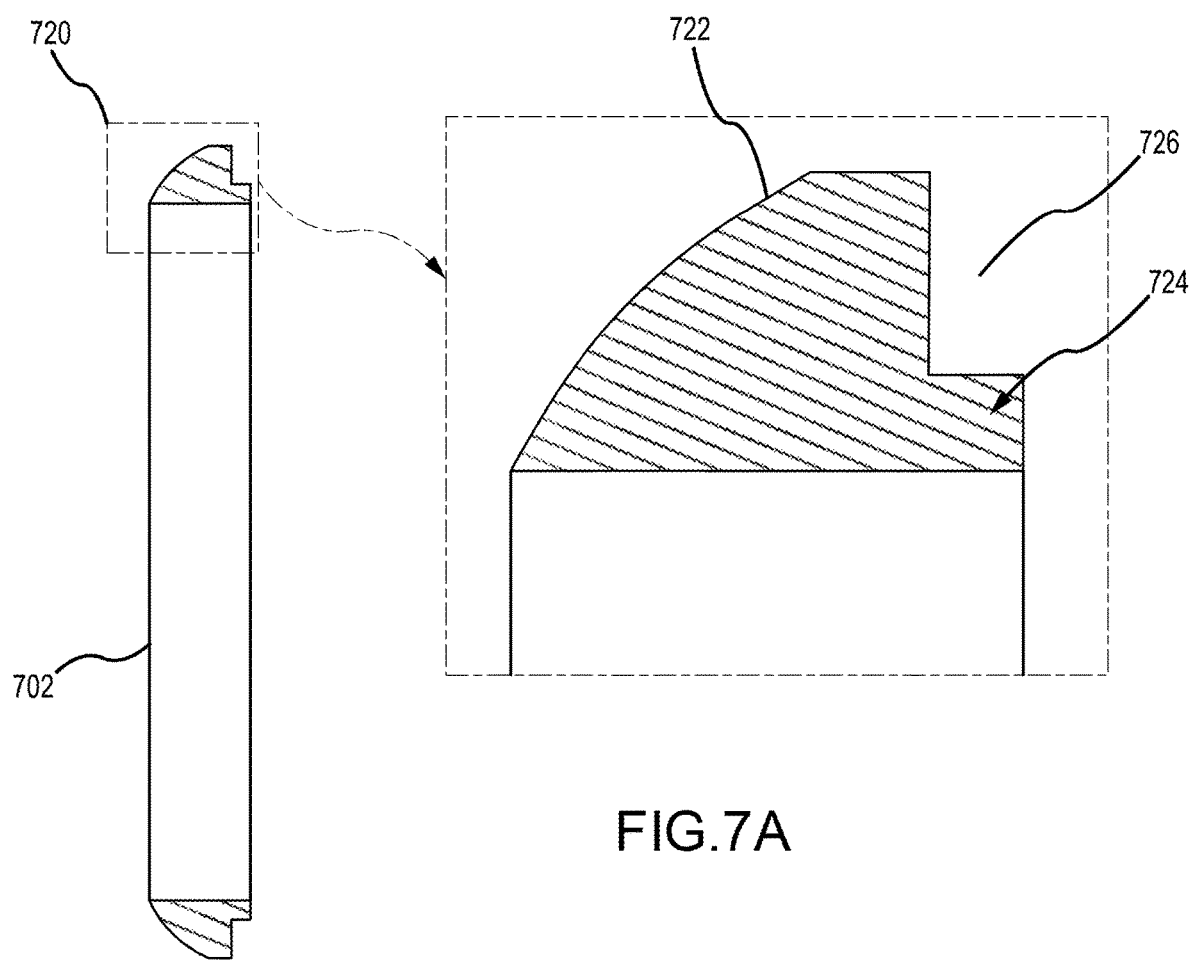
Figure 7B:
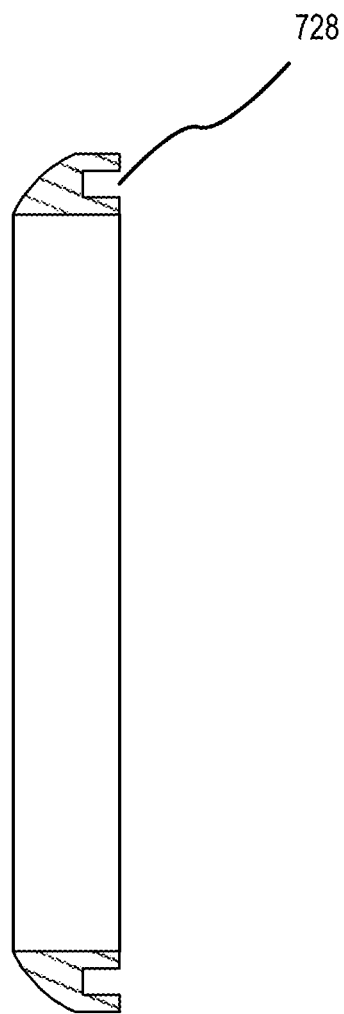
Figure 7C:
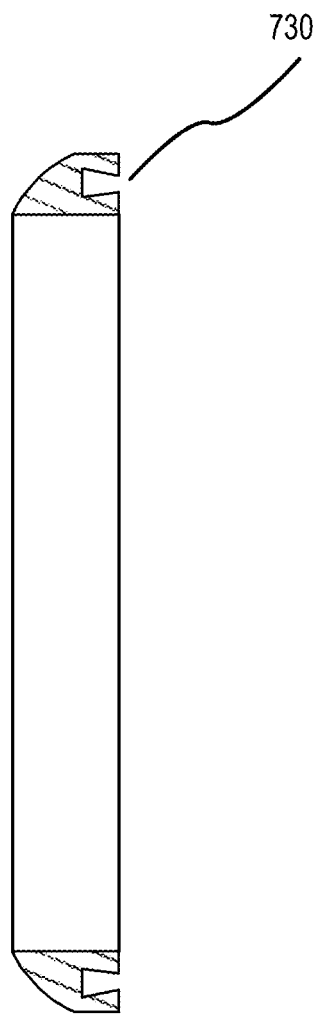
Figure 8:
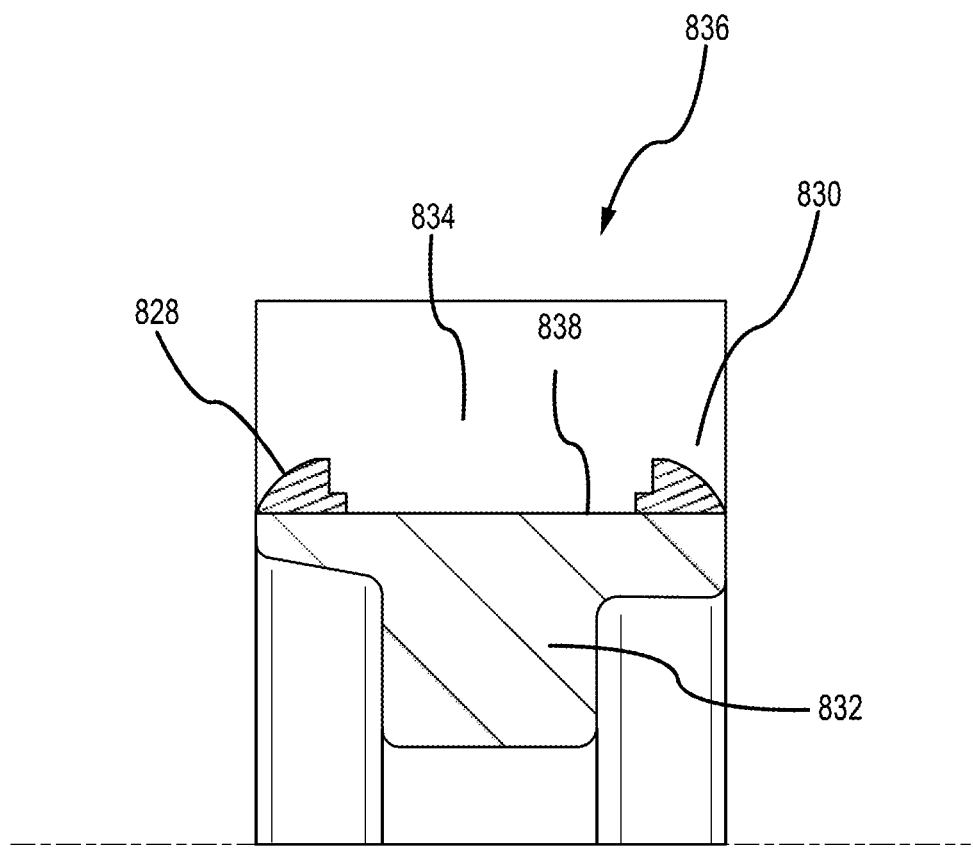
Figure 9:
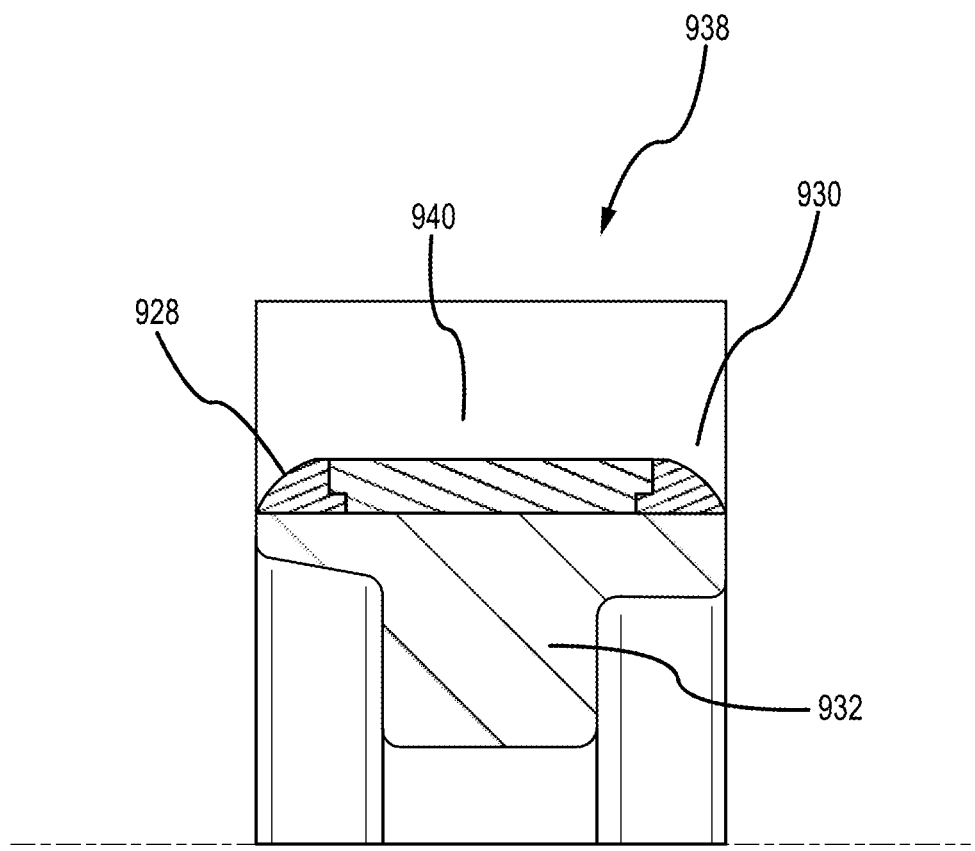

3, in accordance with various embodiments;

FIG. 6 illustrates a cylindrical region of the composite tire of FIG. 3, in accordance with various embodiments;

FIG. 7A illustrates a cross-section of an edge region, with a fillet and an extended cylindrical step, in accordance with various embodiments;

FIG. 7B illustrates a cross-section of an edge region, with a fillet and a box joint profile, in accordance with various embodiments;

FIG. 7C illustrates a cross-section of an edge region, with a fillet and a dovetail profile, in accordance with various embodiments;

FIG. 8 illustrates a cross-section of a first material in a first die, and a wheel, in accordance with various embodiments; and FIG. 9 illustrates a cross-section of a second material in a second die, a first material in a first die, and a wheel, in accordance with various embodiments.

FIG. 10 illustrates a process flow for molding a composite tire.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
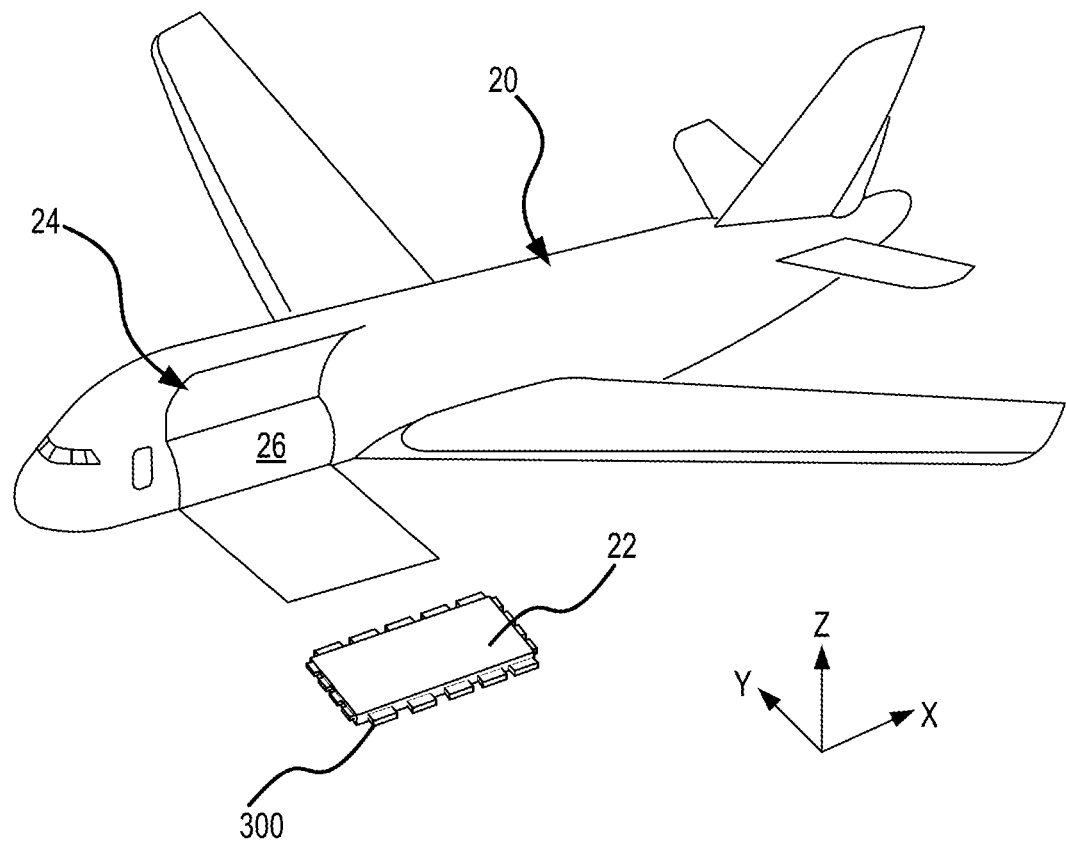
FIG. 1 illustrates an aircraft being loaded with cargo, in accordance with various embodiments.
Figure 2A:
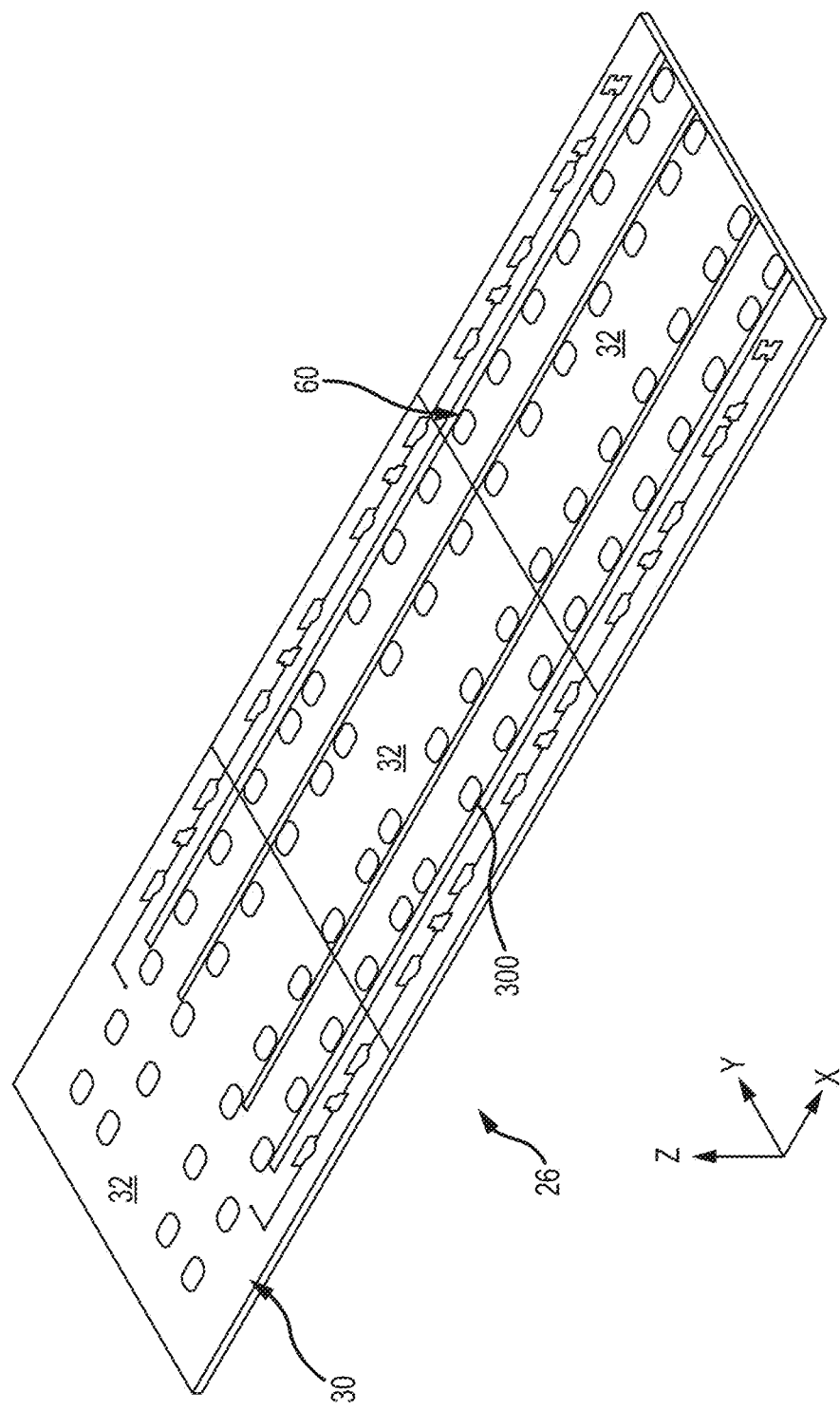
FIG. 2A illustrates a surface of an aircraft cargo deck having a PDU base, in accordance with various embodiments.

FIG. 1 illustrates an aircraft 20 with cargo 22 being loadable through a loading door 24 of the aircraft 20. Cargo 22 (e.g., a unit load device (ULD), pallet, or the like) may be loaded through loading door 24 and onto a cargo deck 26. FIG. 2A illustrates cargo deck 26. Cargo deck 26 includes a cargo deck floor 30, which may be formed by one or more panels 32 that are coupled to various structural components of aircraft 20 (e.g., to beams, floors, etc.).

Figure 2B:
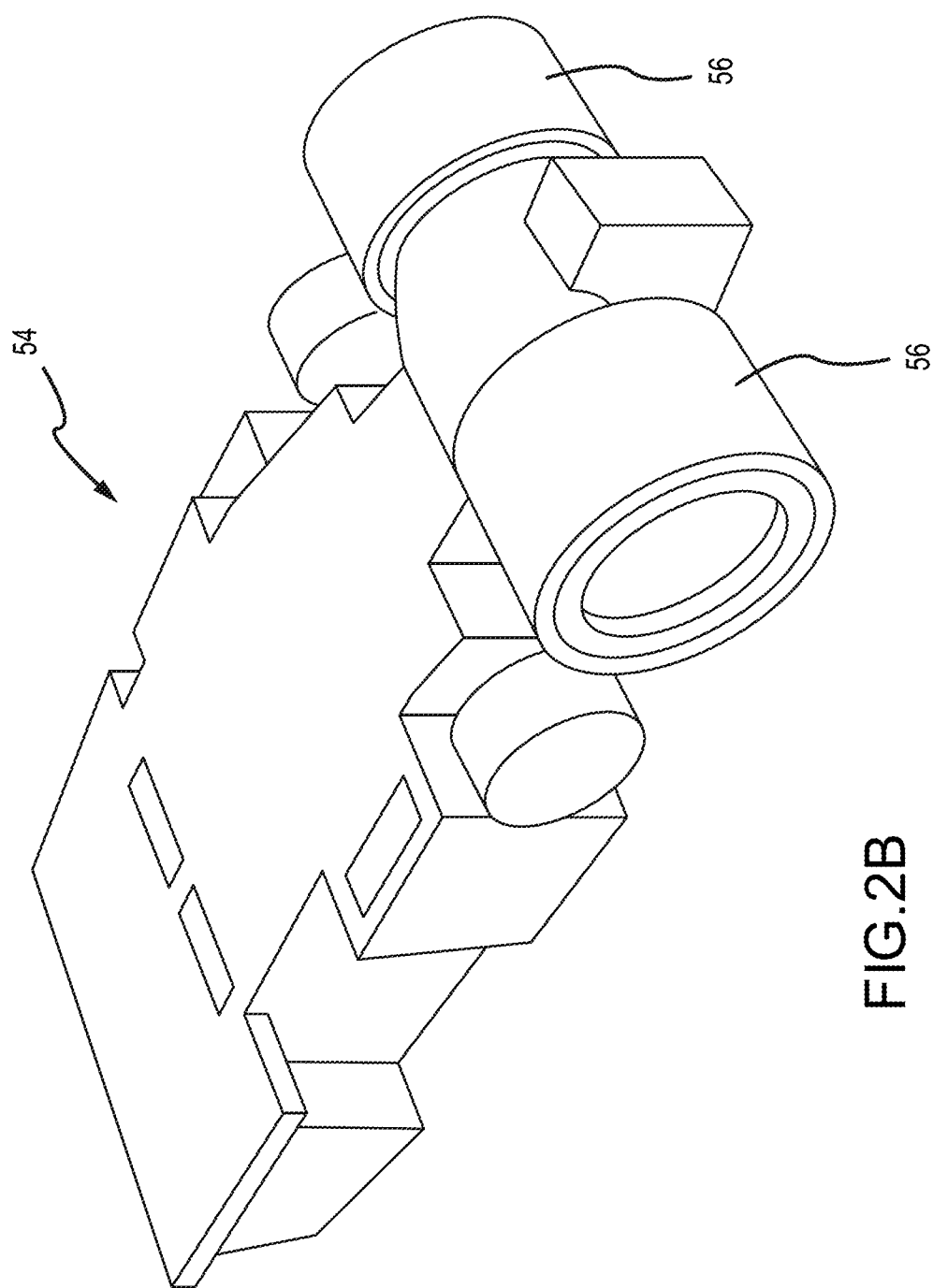
FIG. 2B illustrates a PDU, in accordance with various embodiments.

With continued reference to FIG. 2A, in accordance with various embodiments, the cargo deck 26 includes a cargo loading system 60 comprising a plurality of freely rotating conveyance rollers and/or power drive units (PDUs) mounted in the cargo deck 26 to define the conveyance plane. Cargo 22 loaded onto the cargo deck 26 can be moved throughout the cargo deck 26. FIG. 2B illustrates a PDU 54 with a plurality of tires 56. The PDU 54 may be configured to engage and propel cargo 22 throughout the cargo deck 26. The plurality of tires 56 may be configured to engage and provide traction for the movement of any manner of cargo 22. In this regard, the tires may be employed to rotate to move cargo loaded onto the cargo deck 26.

FIG. 3 illustrates a tire assembly 300. As shown, the tire assembly 300 may include a composite tire 301 bonded to a wheel 308. In various embodiments, the wheel may rotatably couple to a component of the PDU 54, such as an axle, or any other suitable bar, rod, or central shaft for rotating a wheel or gear. The wheel 308 may be configured to rotate in response to a drive motor of the PDU 54. The wheel 308 may also be configured to engage and rotate in response to cargo 22 being rolled across the tire assembly 300. In various embodiments, the composite tire 301 may include a plurality of regions. For example, the composite tire may include a first edge region 302, a second edge region 304, and a cylindrical region 306 located between the first edge region 302 and the second edge region 304. In accordance with various embodiments, the composite tire 301 may be bonded, for example, to the wheel 308. As described in further detail below, the various regions of the composite tire 301 may be configured to provide adequate traction for the movement of cargo 22.

Figure 4:
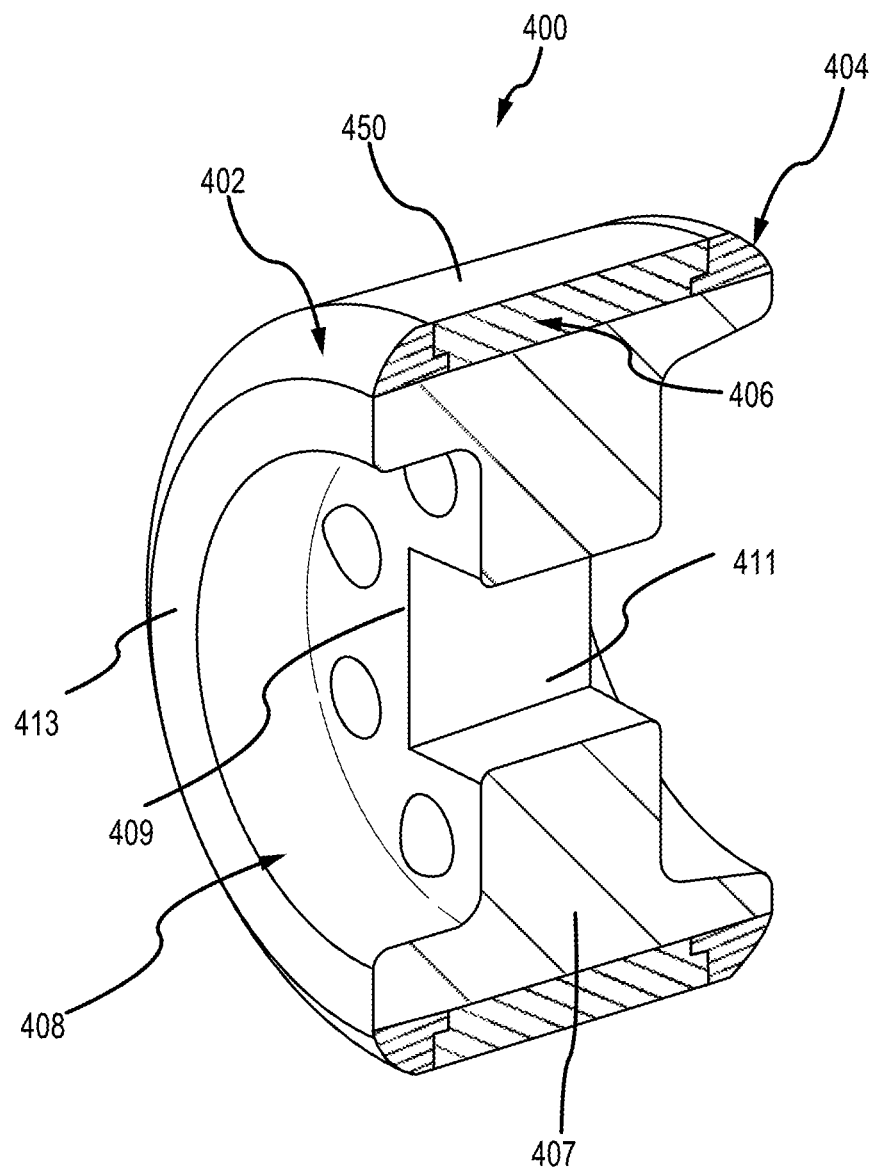
FIG. 4 illustrates a cross-section of the PDU tire assembly, composite tire, and wheel of FIG. 3, in accordance with various embodiments.

Referring now to FIG. 4, a cross-section view of a tire assembly 400 is illustrated. As shown, for example, the first edge region 402 and the second edge region 404 are coupled to the cylindrical region 406. Tread 450 may be imprinted or otherwise disposed on the surface of cylindrical region 406. The edge regions (402 and 404) may include material that is different from that of the cylindrical region 406. Stated differently, the edge regions (402 and 404) may include a first material while the cylindrical region 406 may include a second material. In various embodiments, the first material may be stiffer than the second material. For example, the first material of the first edge region 402 and the second edge region 404 may be configured to have a greater wear resistance and greater abrasion resistance relative to the cylindrical region 406 as cargo 22 is rolled across the tire assembly 300. Stated differently, the edge regions may be configured to resist chipping as cargo 22 climbs onto the tire. In various embodiments, the first material may be any suitable chip resistant material. Suitable materials include, natural rubber, synthetic rubber, synthetic rubber with high carbon black composition, nitrile butadiene rubber, polyurethane rubber, neoprene, thermoplastic elastomer rubbers, styrene butadiene rubber (SBR), and the like. In various embodiments, the first material may exhibit cutting resistance and tearing resistance properties. In various embodiments, the second material may be any suitable material for providing traction as a ULD rolls across the tire assembly 400. Suitable materials include, natural rubber, natural rubber with high silica composition, synthetic rubber, synthetic rubber with high carbon black composition, nitrile butadiene rubber, polyurethane rubber, neoprene, thermoplastic elastomer rubbers, styrene butadiene rubber (SBR), and the like. In various embodiments, the second material may exhibit more compliance and offer a higher coefficient of friction than the first material.

With continued reference to FIG. 4, in accordance with various embodiments, the tire assembly 400 includes a wheel 407. As shown, the wheel may include an inner hub 409 defining a cavity 411, and an outer rim 408. In various embodiments, the outer rim includes a flange 413. The wheel 407 may be made of any appropriate metal, such as steel, iron, aluminum, or any associated alloys, castings, or forgings.

Figure 5:
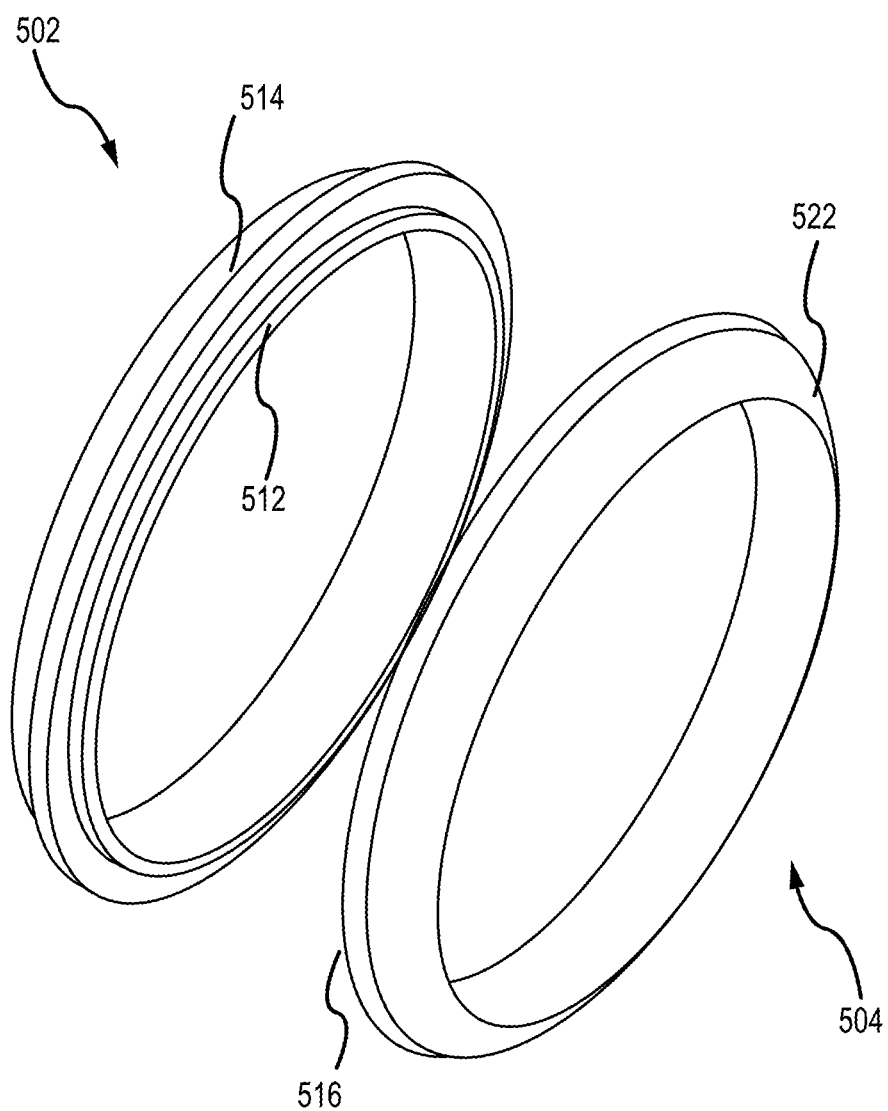

Referring now to FIG. 5, additional details of a first edge region 502 and a second edge region 504 are shown. As shown, the first edge region 502 and the second edge region 504 may include fillet profiles (514 and 522). In various embodiments, the fillet profiles (514 and 522) may reduce the chances of chipping because of cargo 22 climb. For example, load stress is especially pronounced on the edge regions (502 and 504) of the composite tire 301 as cargo 22 is loaded onto or across the tire assembly. In having a fillet profile (514 and 522), the edge regions (502 and 504) may enable a desirable ramping effect for ULD or cargo 22 climb compared to, for example, a sharper-edged or substantially 90-degree profile. This effect is desirable since, during cargo loading, cargo 22 may not always be aligned to the tire assembly's axis to prevent cargo climb across the edges. Stated differently, the edge regions' (502 and 504) fillet profiles (514 and 522) may be configured to reduce abrasion and chipping, and diminish stress from cargo 22 impact, extending the life of the composite tire 301.

In continued reference to FIG. 5, the first edge region 502 may include a first bonding region 512. As will be discussed in further detail below, the first edge region 502 may be configured to couple to the cylindrical region 306 of the composite tire 301 at the first bonding region 512. Likewise, the second edge region 504 may include a second bonding region 516. In various embodiments, the second edge region 504 may be configured to couple to the cylindrical region 306 of the composite tire 301 at the second bonding region. In various embodiments, the bonding regions (512 and 516) may be continuous throughout the circumference of the edge regions (502 and 504) and the cylindrical region 306. In various embodiments, the bonding regions (512 and 516) may be of intermittent sections along the circumference of the edge regions (502 and 504) and the cylindrical region 306.

Referring to FIG. 6, additional details of a cylindrical region 606 are shown. As shown, the cylindrical region includes a face 618 that bears the traction load as cargo 22 is loaded onto the tire assembly 300. The various embodiments, the face 618 of the cylindrical region 606 may include a plurality of treads. The face 618 may include a plurality of treads of any desirable pattern, including for example, directional, symmetrical, asymmetrical, and directional/asymmetrical.

In continued reference to FIG. 6, the cylindrical region 606 includes a first circumferential groove 616 on one side of the cylindrical region 606, and a second circumferential groove 614 on another side of the cylindrical region 606. In various embodiments, the first circumferential groove 616 may be configured to couple to the first edge region 502 at the first bonding region 512. Likewise, the second circumferential groove 614 may be configured to couple to the second edge region 504 at the second bonding region 516.

In various embodiments, the cylindrical region 606 has greater traction relative to the edge regions (302 and 304) of the composite tire 301. In various embodiments, second material of the cylindrical region 606 may have a higher coefficient of thermal expansion relative to the first material of the edge regions (302 and 304). For example, in response to environmental factors when loading or unloading cargo 22 in various climates, natural thermal expansion and contraction of the cylindrical region 606 and the edge regions (302 and 304) may occur. It may be desirable, for example, for the second material of the cylindrical region 606 to expand at a higher heating relative to the first material of the edge regions (302 and 304). This may improve adhesion between the cylindrical region 606 and the edge regions (302 and 304) as temperature declines.

Referring now to FIG. 7A, a cross-section of a wheel 702 and a cross-section portion 720 of an edge region (302 and 304) bonded to the wheel 702 is shown. As shown, the edge region (302 and 304) includes a fillet 722 and an extended cylindrical step 724. In various embodiments, the extended cylindrical step 724 may be set at a substantially 90-degree angle, or at any other suitable angle, relative to the rest of the edge region (302 and 304). In various embodiments, the extended cylindrical step 724 is configured to increase the bonding area of the edge region (302 and 304) with the wheel 702 for improved adhesion. In various embodiments, the extended cylindrical step 724 is configured to increase the bonding area of the edge region (302 and 304) with a cylindrical region 306 for improved adhesion at the bonding region 726.

FIGS. 7B and 7C illustrate the cross-section of the wheel 702 and edge region (302 and 304) bonded to the wheel of FIG. 7A. As shown, FIG. 7B illustrates the edge region (302 and 304) including a box joint profile 728. In various embodiments, the box joint profile 728 may couple to a complementary interlocking profile extending from the circumferential groove (616 and 614) of the cylindrical region 606 at the bonding region 726. FIG. 7C shows the edge region (302 and 304) including a dovetail profile 730. In various embodiments, the dovetail profile 730 may couple to a dovetail pin extending from the circumferential groove (616 and 614) of the cylindrical region 606 at the bonding region 726. The edge region (302 and 304) may include any suitable profile that is configured to increase the bonding area between the edge region (302 and 304) and the cylindrical region 606 for improved adhesion, and any suitable profile that increases the bonding area between the edge region (302 and 304) and the wheel 702 for improved adhesion.

Referring to FIG. 8, a cross-section of a tire assembly mold 836 is shown. As shown, and as further referenced in FIG. 10, a first die 834 may be disposed (step 80) relative to a wheel 832. In various embodiments, the tire assembly mold 836 may include a first end 828 and a second end 830.

In various embodiments, the tire assembly mold 836 may define a recess 838 disposed between the first end 828 and the second end 830. In various embodiments, using injection molding techniques, a first material may be injected (step 82) at a first temperature into the first end 828 and the second end 830 of the first die 834. The first material may be injected into the first end 828 and the second end 830 simultaneously, or sequentially in any order. In various embodiments, the first temperature may be any suitable temperature above an ambient temperature. In various embodiments, the first material may be any suitable chip resistant material. In various embodiments, injecting the first material into the first die 834 may form (step 84) a first edge region 302 and a second edge region 304 of a composite tire 301. The first edge region 302 and the second edge region 304 formed on the first end 828 and the second end 830, respectively, may be bonded to the wheel 832. In various embodiments, the first die 834 may be removed (step 86) from the wheel 832 as the first material is above the ambient temperature. In various embodiments, a suitable adhesive may be applied (step 88) to bonding regions (512 and 516) of the first edge region 302 and the second edge region 304. Suitable adhesives may include cyanoacrylate adhesives, silicone adhesives, acrylic adhesives, contact adhesives, solvent-based adhesives, epoxies, and the like.

In various embodiments, the first edge region 302 and the second edge region 304 may be formed from the first material using any suitable molding technique, such as compression molding, or the like. In various embodiments, using compression molding techniques, the first material may be pressurized, forming a first edge region 302 and a second edge region 304 of a composite tire 301. In such embodiments, the first die 834 may be removed from the wheel 832 as the first material exhibits a higher molding pressure.

Referring now to FIG. 9, a cross-section of a tire assembly mold 938 is shown. As shown, and as further referenced in FIG. 10, a second die 940 may be disposed 90 relative to the wheel 932. In various embodiments, the second die 940 may be disposed 90 relative to the wheel 932 while the first material of the first edge region 928 and the second edge region 930 is above the ambient temperature. In various embodiments, the second die 940 may be disposed (step 90) between the edge regions (928 and 930) formed by the first die 834. In various embodiments, using injection molding techniques, a second material may be injected (step 92) into the second die 940 while the first material is above the ambient temperature. In various embodiments, the second material may be injected (step 92) at a second temperature above an ambient temperature. In various embodiments, the second temperature may be any suitable temperature above an ambient temperature. In various embodiments, the second material may be any suitable material for providing traction as cargo 22 rolls across a tire assembly 300. In various embodiments, injecting (step 92) the second material into the second die 940 may form (step 94) a cylindrical region 306. In various embodiments, injecting (step 92) the second material into the second die 940 to form (step 94) the cylindrical region 306 while the first material of the edge regions (302 and 304) is above an ambient temperature may bond (step 96) the cylindrical region 306 to the first edge region 302 and the second edge region 304.

In various embodiments, the cylindrical region 306 may be formed from the second material using any suitable molding technique, such as compression molding, or the like. In various embodiments, using compression molding techniques, the second die 940 may be disposed (step 90) relative to the wheel 932 while the first material of the first edge region 928 and the second edge region 930 exhibits a higher molding pressure. In such embodiments, the second material may be pressurized, forming a cylindrical region 306 of a composite tire 301. In various embodiments, pressurizing the second material in the second die 940 to form the cylindrical region 306 while the first material of the edge regions (302 and 304) exhibits higher molding pressure may bond (step 96) the cylindrical region 306 to the first edge region 302 and the second edge region 304.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A composite tire, the composite tire comprising:
a cylindrical region having a first circumferential groove and a second circumferential groove, an inner radial portion of the cylindrical region configured to couple to a first outer radial portion of a wheel;
a first edge region having a fillet, wherein the first edge region is configured to axially couple to the first circumferential groove at a first bonding region and wherein an inner radial portion of the first edge region is configured to couple to a second outer radial portion of the wheel; and
a second edge region having a fillet, wherein the second edge region is configured to axially couple to the second circumferential groove at a second bonding region and wherein an inner radial portion of the second edge region is configured to couple to a third outer radial portion of the wheel,
wherein the first edge region and the second edge region comprise a first material and the cylindrical region comprises a second material, wherein the first material is stiffer than the second material, wherein the first material and the second material are different materials.

2. The composite tire of claim 1, wherein the first edge region comprises a first extended cylindrical step coupled to the first circumferential groove at the first bonding region.

3. The composite tire of claim 2, wherein the second edge region comprises a second extended cylindrical step coupled to the second circumferential groove at the second bonding region.

4. The composite tire of claim 1, wherein the first edge region comprises a first box joint profile coupled to a first complimentary interlocking profile extending from the first circumferential groove at the first bonding region.

5. The composite tire of claim 4, wherein the second edge region comprises a second box joint profile coupled to a second complimentary interlocking profile extending from the second circumferential groove at the second bonding region.

6. The composite tire of claim 1, wherein the first edge region comprises a first dovetail profile coupled to a first dovetail pin extending from the first circumferential groove at the first bonding region.

7. The composite tire of claim 6, wherein the second edge region comprises a second dovetail profile coupled to a second dovetail pin extending from the second circumferential groove at the second bonding region.

8. The composite tire of claim 1, wherein the first edge region and the second edge region have a greater wear resistance relative to the cylindrical region.

9. The composite tire of claim 1, wherein the first edge region and the second edge region have a greater abrasion resistance relative to the cylindrical region.

10. The composite tire of claim 1, wherein the cylindrical region comprises a plurality of treads.

11. The composite tire of claim 10, wherein the cylindrical region has greater traction relative to the first edge region and the second edge region.

12. The composite tire of claim 1, wherein the cylindrical region has a higher coefficient of thermal expansion relative to the first edge region and the second edge region.

13. A tire assembly comprising:
a composite tire bonded to a wheel, the composite tire comprising:
a cylindrical region having a first circumferential groove and a second circumferential groove, an inner radial portion of the cylindrical region configured to couple to a first outer radial portion of the wheel;
a first edge region having a fillet, wherein the first edge region is configured to axially couple to the first circumferential groove at a first bonding region and wherein an inner radial portion of the first edge region is configured to couple to a second outer radial portion of the wheel; and
a second edge region having a fillet, wherein the second edge region is configured to axially couple to the second circumferential groove at a second bonding region and wherein an inner radial portion of the second edge region is configured to couple to a third outer radial portion of the wheel,
wherein the first edge region and the second edge region comprise a first material and the cylindrical region comprises a second material, wherein the first material is stiffer than the second material, wherein the first material and the second material are different.

14. The tire assembly of claim 13, the wheel further comprising:
an inner hub, wherein the inner hub defines a cavity; and
an outer rim having a flange.

15. The tire assembly of claim 14, wherein the first edge region comprises a first extended cylindrical step coupled to the first circumferential groove at the first bonding region.

16. The tire assembly of claim 15, wherein the second edge region comprises a second extended cylindrical step coupled to the second circumferential groove at the second bonding region.

17. The tire assembly of claim 15, wherein the first edge region comprises a first box joint profile coupled to a first complimentary interlocking profile extending from the first circumferential groove at the first bonding region.

* * * * *